United States Patent
Yao et al.

(10) Patent No.: US 9,866,123 B2
(45) Date of Patent: Jan. 9, 2018

(54) POWER CONVERTER WITH DYNAMIC PRELOAD

(71) Applicant: DIALOG SEMICONDUCTOR INC., Campbell, CA (US)

(72) Inventors: Jianming Yao, Cupertino, CA (US); Yimin Chen, San Jose, CA (US); Dickson T. Wong, Burlingame, CA (US); Yong Li, San Jose, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 15/026,228

(22) PCT Filed: Oct. 29, 2014

(86) PCT No.: PCT/US2014/062975
§ 371 (c)(1),
(2) Date: Mar. 30, 2016

(87) PCT Pub. No.: WO2015/066221
PCT Pub. Date: May 7, 2015

(65) Prior Publication Data
US 2016/0218628 A1    Jul. 28, 2016

Related U.S. Application Data

(60) Provisional application No. 61/898,405, filed on Oct. 31, 2013.

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0009* (2013.01);
(Continued)

(58) Field of Classification Search
CPC .......... H02M 1/00; H02M 1/08; H02M 1/088; H02M 1/10; H02M 7/00; H02M 7/02;
(Continued)

(56) References Cited

U.S. PATENT DOCUMENTS

| 6,940,320 | B2 * | 9/2005 | Sukup | H02M 1/36 327/112 |
| 7,265,999 | B2 * | 9/2007 | Murata | H02M 3/33523 363/16 |

(Continued)

FOREIGN PATENT DOCUMENTS

CN     201270006 Y     7/2009

OTHER PUBLICATIONS

PCT International Search Report and Written Opinion, PCT/US2014/062975, Jan. 22, 2015, 15 Pages.
(Continued)

*Primary Examiner* — Yemane Mehari
(74) *Attorney, Agent, or Firm* — Fenwick & West LLP (57) ABSTRACT

A power converter with a dynamic preload. The power converter includes a magnetic component coupled between an input and an output of the power converter. The output of the power converter has an output voltage for providing power to a load. A switch is adapted to control current through the magnetic component according to on and off times of the switch. A dynamic preload circuit is coupled to the output of the power converter. The dynamic preload has loading characteristics that are adjusted responsive to a signal indicative of an output voltage at the output of the power converter.

20 Claims, 4 Drawing Sheets

(52) U.S. Cl.
CPC .............. *H02M 2001/0025* (2013.01); *H02M 2001/0032* (2013.01); *Y02B 70/16* (2013.01)

(58) Field of Classification Search
CPC .... H02M 7/04; H02M 7/043; H02M 2001/00; H02M 2001/0003; H02M 2001/0006; H02M 2001/0009; H02M 2001/0016; H02M 2001/0022; H02M 2001/0045; H02M 2001/0048; H02M 2001/0064
USPC ................................ 363/16, 21.01–21.18, 26
See application file for complete search history.

(56) References Cited

U.S. PATENT DOCUMENTS

| | | | |
|---|---|---|---|
| 2001/0028570 A1* | 10/2001 | Mullett ............. | H02M 3/33561 363/21.18 |
| 2005/0019052 A1* | 1/2005 | Claassen ................ | G03G 15/80 399/88 |
| 2011/0069420 A1* | 3/2011 | Chiu ....................... | H02M 1/36 361/91.1 |
| 2013/0141948 A1 | 6/2013 | Bailey et al. | |
| 2013/0223108 A1* | 8/2013 | Xu ..................... | H02M 3/33507 363/21.17 |

OTHER PUBLICATIONS

Chinese First Office Action, Chinese Application No. 201480059450.6, dated Oct. 9, 2017, 19 pages.

* cited by examiner

POWER CONVERTER WITH DYNAMIC PRELOAD

CROSS REFERENCE TO RELATED APPLICATIONS

This application claims priority from U.S. Provisional Application No. 61/898,405 entitled "Power Converter with Dynamic Preload" and filed on Oct. 31, 2013, the contents of which are incorporated by reference herein in their entirety.

BACKGROUND

1. Field of the Disclosure

The present disclosure relates to a power converter and, more specifically, to a power converter with a dynamic preload.

2. Description of the Related Art

With the recent explosive growth in the number of electronic devices, the demand for power converters used as adapters or chargers for these electronic devices has also grown at a rapid rate. Power converters are typically controlled by power converter controllers. In particular, switched mode power converters are typically controlled by power converter controllers that control the on-times ($T_{ON}$) or off-times ($T_{OFF}$) of the switch in the power converters to regulate the output voltage and power of the power converters.

Conventional power converters deliver a constant output voltage at a fixed voltage level (e.g. 5 V). Newer power converters are beginning to introduce the ability to deliver constant output voltage at different fixed voltage levels for faster charging of electronic devices. However, these power converters do not operate efficiently and tend to consume more power than necessary.

SUMMARY

Embodiments of the present disclosure include a power converter that has a dynamic preload to balance the power and to improve the performance of the power converter. In one embodiment, the power converter comprises a magnetic component coupled between an input and an output of the power converter. The output of the power converter has an output voltage for providing power to a load. A switch controls current through the magnetic component according to on and off times of the switch. A dynamic preload circuit is coupled to the output of the power converter. The dynamic preload has adjustable loading characteristics. For example, the dynamic preload can present a resistance to the output of the power converter and the resistance is adjusted responsive to a signal indicative of the output voltage at the output of the power converter. As another example. the dynamic preload can also draw current from the output of the power converter and the current drawn is adjusted based on a signal indicative of the output voltage at the output of the power converter.

In one embodiment, a method of operation in the power converter is disclosed. The method comprises regulating an output voltage at the output of the power converter for providing power to a load. The output of the power converter is coupled to a dynamic preload circuit. The method also comprises adjusting a loading characteristic of the dynamic preload circuit based on a signal indicative of the output voltage at the output of the power converter. For example, the resistance presented by the dynamic preload circuit to the output of the power converter or the current drawn by the dynamic preload circuit can be adjusted based on the signal indicative of the output voltage at the output of the power converter.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. Reference will now be made in detail to several embodiments of the present disclosure, examples of which are illustrated in the accompanying figures. It is noted that wherever practicable similar or like reference numbers may be used in the figures and may indicate similar or like functionality. One skilled in the art will readily recognize from the following description that alternative embodiments of the structures and methods illustrated herein may be employed without departing from the principles of the disclosure described herein.

Embodiments of the present disclosure related to a power converter with a dynamic preload. The loading characteristics of the dynamic preload are adjusted for different output voltage levels. For example, the preload may have a lower resistance at low output voltage levels and a higher resistance at higher output voltage levels. By adjusting the loading of the dynamic preload, the output voltage of the power converter can be adjusted without significantly affecting the power consumed in the preload.

Figure 1:
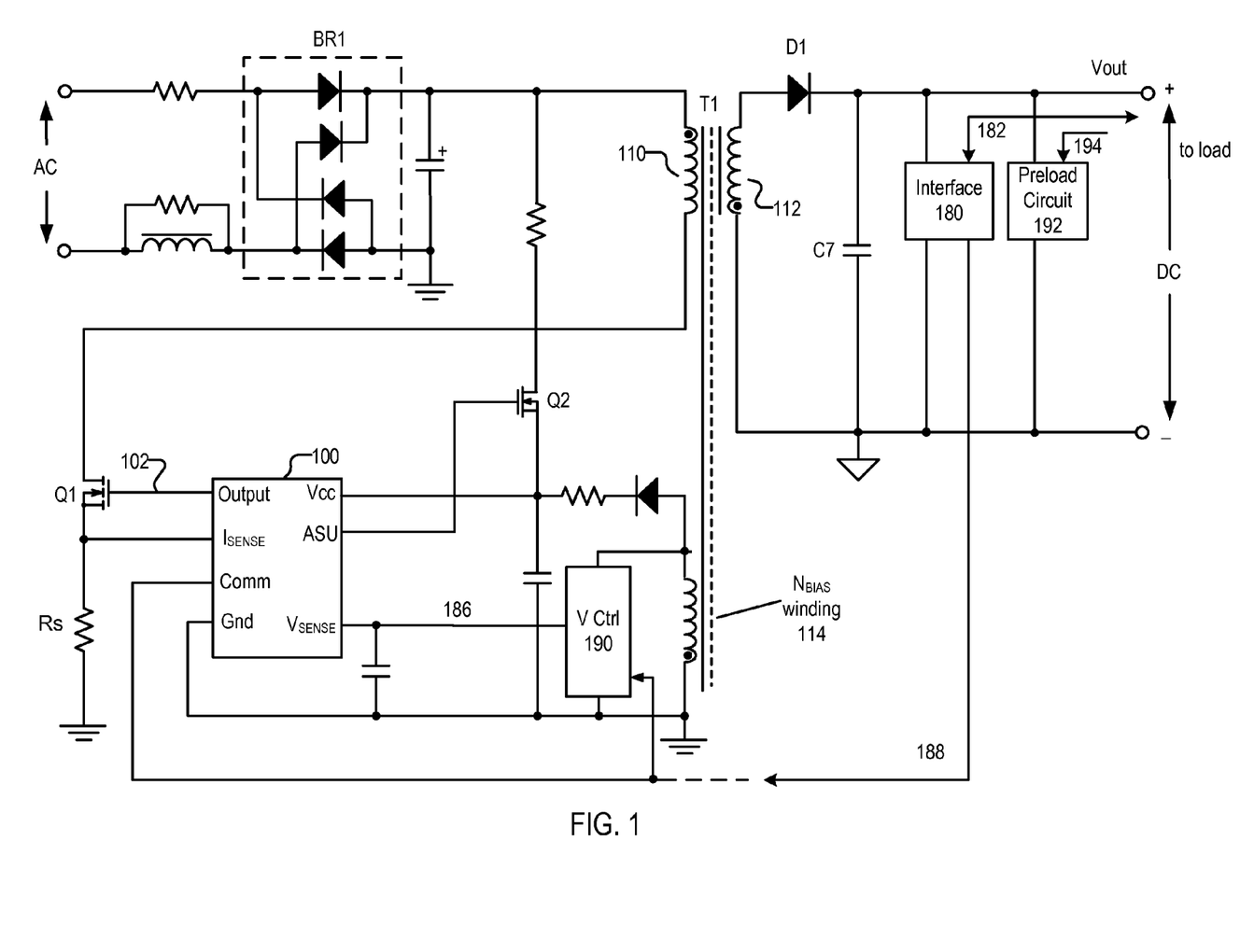
FIG. 1 is an AC-DC flyback power converter with primary-side sensing of the output voltage, according to one embodiment of the present disclosure.

FIG. 1 illustrates AC-DC flyback power converter with primary-side sensing, according to one embodiment. The power converter includes, among other components, a bridge rectifier BR1, a transformer T1, a transistor switch Q1, a transistor switch Q2, an output rectifier diode D1, output filter capacitor C7, a power converter controller 100, voltage control circuit 190, load interface circuit 180, and dynamic preload circuit 192. In some embodiments, the dynamic preload circuit 192 and the interface circuit 180 may be part of the same integrated circuit (IC), be separate ICs, or be made from discrete components.

The power converter receives an AC input voltage, converts it into a DC output voltage Vout at one of several possible fixed voltage levels, and provides the output voltage Vout to a load. The load can be, for example, an electronic device that is powered by the output voltage Vout through a universal serial bus (USB) cable or other customized or standard output cable between a power adapter and an electronic device. Although the power converter of FIG. 1 is an AC-DC flyback converter with primary side sensing of the feedback signals, it should be noted that the present disclosure is not limited to a flyback converter and that it can be applied to any type of switching power converter of any topology (e.g. forward converter, etc).

The rectifier BR1 receives an AC input voltage and converts it into a full-wave rectified input voltage for use in generating the output DC voltage. The full-wave rectified input voltage is provided to the primary side winding of transformer T1. A secondary side winding 112 of transformer T1 is connected to the output side of the power converter through diode D1. The transformer T1 also includes an auxiliary winding $N_{BIAS}$ 114 having a reflected secondary voltage that is proportional to the voltage across the secondary winding 112. Transformer T1 is an example of a magnetic component, and in other power converter topologies, transformer T1 may be replaced by an inductor.

The power converter controller 100 receives a supply voltage via the Vcc pin, and is connected to ground via the Gnd pin. The ASU pin provides a control signal for active start up functionality of the supply voltage 130, and the pin may be left floating if active start up is not desired. When the AC input voltage is initially applied to the power converter, transistor switch Q2 is switched on to charge the power supply voltage 130 through the switch Q2. Once the power supply voltage 130 has reached a threshold level and the flyback operation of the power converter is enabled, the switch Q2 is turned off and the power supply voltage 130 is maintained by a reflected secondary voltage on the auxiliary windings $N_{BIAS}$ 114 of the transformer T1.

The power converter controller 100 controls the closing and opening of the switch Q1 using an output control signal 102 in the form of pulses with on-times ($T_{ON}$) and off-times ($T_{OFF}$), respectively. The pulses may be generated with pulse width modulation (PWM), pulse frequency modulation (PFM) or a combination of PWM and PFM. When switch Q1 is turned on (closed), current increases in the transistor T1 and causes energy to be stored in the primary side winding 110 of the transformer T1 because the diode D1 is reverse biased. When the switch Q1 is turned off (opened), the energy stored in the primary side 110 of the transformer T1 is released to the secondary side 112 of the transformer T1 because the diode D1 becomes forward biased. The diode D1 rectifies the output voltage on the secondary windings 112 of the transformer T1 and the capacitor C7 filters the output voltage signal on the secondary windings 112 of the transformer T1 for generating the output voltage Vout. By controlling the period of time during which the switch Q1 is on or off, i.e., the on-times ($T_{ON}$) and off-times ($T_{OFF}$), the power converter controller 100 can control the amount of energy delivered to the output side of the power converter.

The $I_{SENSE}$ pin senses the current flowing through switch Q1 in the form of a voltage across current sensing resistor Rs. The $V_{SENSE}$ pin receives a feedback signal 186 which is a divided-down version of the reflected secondary voltage on the auxiliary windings $N_{BIAS}$ 114 of the transformer T1. The feedback signals received on the $I_{SENSE}$ and $V_{SENSE}$ pins are then used to regulate the on and off times of switch Q1, thereby regulating the output voltage Vout of the power converter to a constant voltage level.

Load interface circuit 180 is coupled to and powered by the output voltage Vout. Load interface circuit communicates with the load (e.g., an electronic device) through load communication signal 182. When the load is first connected to the power converter, the load interface circuit 180 performs handshaking operations with the load through the load communication signal 180. In one embodiment, the load communication signal 182 may be a digital USB signal.

After handshaking is completed, the load interface circuit 180 receives a desired/target voltage level for the output voltage Vout from the load via the load communication signal 182. Different loads may request different voltage levels (e.g. 5V, 9V, 12 V) depending on the design of the electronic device serving as the load. The load interface circuit 180 converts the desired/target voltage level into a pulse pattern that is transmitted across signal path 188. Signal path 188 may include an optocoupler, digital isolator, magnetic isolator, or other types of components that maintain electrical isolation between the interface circuit 180 on the secondary side of the transformer T1 and components on the primary side of the transformer T1. The pulse pattern indicates the desired/target voltage level and is received by the voltage control circuit 190 and power converter controller 100.

Voltage control circuit 190 receives a reflected secondary voltage from the auxiliary winding 114. The level of reflected secondary voltage is then adjusted to generate the feedback signal 186. The voltage control circuit 190 adjusts the level of the feedback signal 186 depending on the desired/target voltage level. For example, the feedback signal 186 can be decreased if a higher output voltage Vout is desired. The feedback signal 186 is then provided to the power converter controller 100, which causes the power converter controller 100 to regulate the output voltage Vout to the desired/target voltage level. In one embodiment, the voltage control circuit 190 is comprised of several resistor divider circuits (not shown in FIG. 1) that divide the reflected secondary voltage down to different voltage level for the feedback signal 186 and that are selected according to the desired/target output voltage.

As power converter of FIG. 1 is a primary side sensing power converter, it periodically checks the level of the output voltage Vout by sensing the voltage feedback signal 186, for example, at every switching cycle of switch Q1. The voltage feedback signal 186 only includes valid voltage information when power is transferred from the primary side 110 of the transformer T1 to the secondary side 112 of the transformer. When a load is drawing power from the output of the power converter, switch Q1 is constantly being switched using PWM to transfer energy from the primary side 110 of the transformer T1 to the secondary side 112 of the transformer to power the load. On the other hand, when the load is not drawing power, switch Q1 is only switched at infrequent intervals using short pulses (i.e. sense pulses). These sense pulses transfer a small amount of energy from the primary side 110 to the secondary side 112 primarily for the purpose of sensing the output voltage Vout.

A dynamic preload circuit 192 is coupled between the output of the power converter and ground and presents a load to the output of the power converter. The dynamic preload circuit 192 is distinct and separate from the actual load powered by the output of the power converter. The dynamic preload circuit 192 dissipates energy that is transferred to the secondary side 112 of the transformer T1 by sense pulses during no load or standby light load conditions.

Dynamic preload circuit 192 receives an output information signal 194 indicating a level of the output voltage Vout. The output information signal 194 can be an analog feedback signal connected to the output voltage Vout (either directly or indirectly through a resistor divider) that indicates an actual level of the output voltage Vout. Alternatively, the output information signal 194 can be a digital signal received from the load, such as a USB signal specifying the desired/target voltage level for the output voltage Vout (i.e., the same as signal 182).

The dynamic preload circuit 192 then adjusts the loading characteristics (e.g. current draw, resistance, etc) of the dynamic preload circuit 192 depending on the level of the output voltage Vout. The loading characteristics can be adjusted to one of several pre-determined loading levels (e.g., current draw levels, resistance levels) that are associated with different output voltage levels. For example, a 5 volt output can be associated with one loading level, a 9 volt output can be associated with another loading level, and a 12 volt output can be associated with still another loading level. In one embodiment, the loading levels are finite and non-zero loading levels.

The loading characteristics of the dynamic preload circuit 192 are generally adjusted such that the power transferred by a sense pulse is dissipated at a similar rate for each possible voltage level of the output voltage Vout. This results in adequate but not excessive power dissipation so that voltage regulation of the output voltage Vout is maintained. In other words, suppose a sense pulse transfers an average of 10 mW of power to the secondary side 112 of the transformer for both a 5V and 12V output voltage Vout. If the output voltage Vout is 5 V, the dynamic preload circuit 192 will be configured to dissipate almost all 10 mW of power (less leakage current power consumption and light load power consumption) to keep power balance at no load or standby light load conditions. If the output voltage Vout is 12 V, the dynamic preload circuit 192 will also be configured to dissipate almost all 10 mW of power.

By adjusting the loading characteristics of dynamic preload circuit 192 as the output voltage Vout changes, the performance of the power converter can be improved when compared to power converters that used a fixed load. First, power efficiency of the power converter can be improved. Fixed loads tend to consume a large amount of power as the voltage increases because of $P=V^2/R$, where P is power, V is voltage, and R is resistance. So dynamically increasing the resistance of the preload circuit 192 reduces power consumption at higher voltages. Second, reliability of the power converter can be improved. Because fixed loads consume higher power as voltage increases, this can result in thermal stress on a preload that is avoided by dynamically adjusting the loading characteristics of the dynamic preload circuit 192.

In a further embodiment, the interface circuit 180 may also receive a current limit setting from the load via the load communication signal 182. The current limit setting indicates a desired/target limit on the current that is delivered by the output of the power converter to the load. The load interface circuit 180 can also convert this desired/target current limit into a pulse pattern that is transmitted across signal path 188 and used by the power converter controller 100 to restrict the amount of current delivered to the load.

Figure 2:
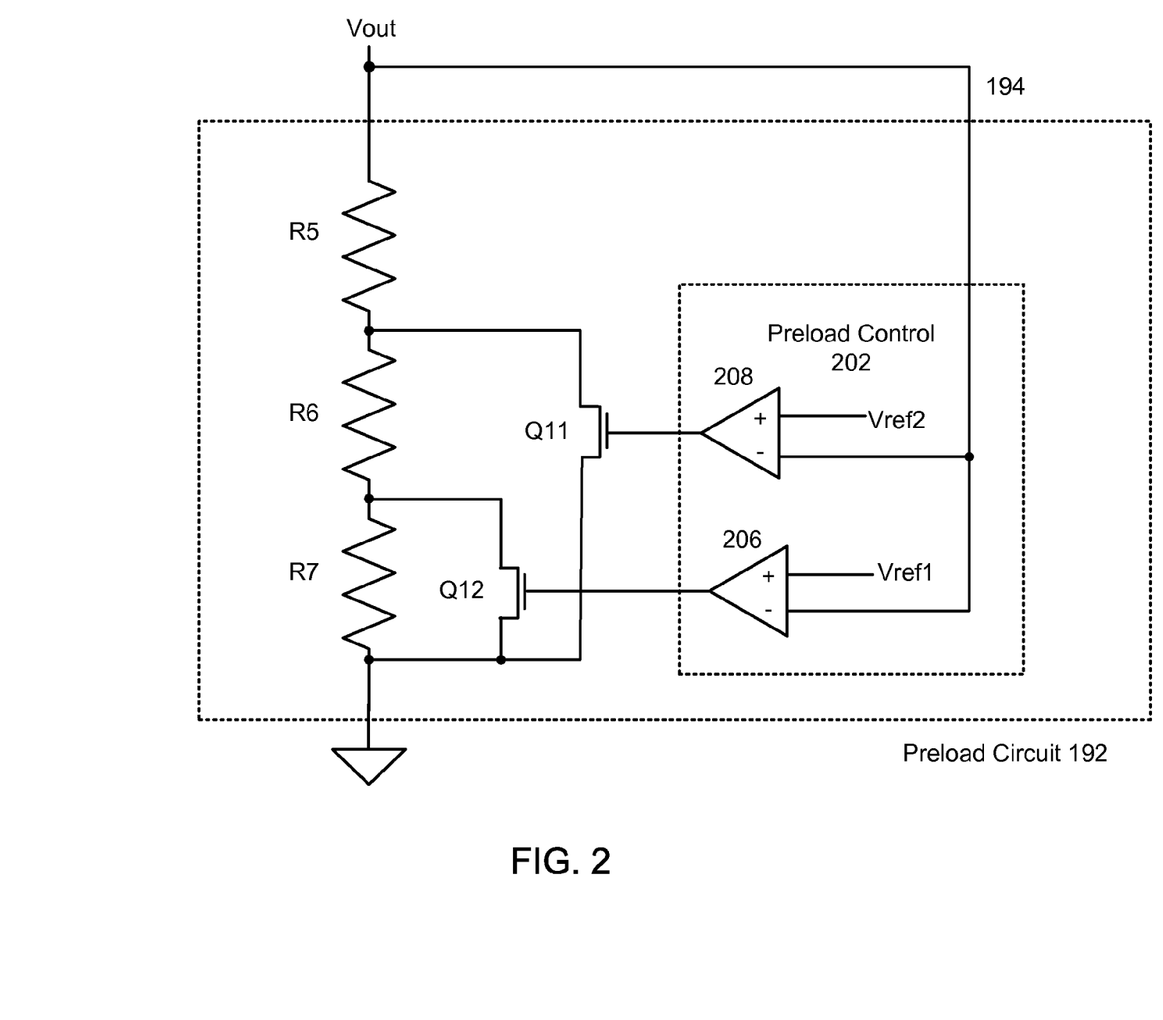
FIG. 2 is a detailed view of the dynamic preload circuit from FIG. 1, according to one embodiment of the present disclosure.

FIG. 2 is a detailed view of the dynamic preload circuit 192 from FIG. 1, according to one embodiment of the present disclosure. Dynamic preload circuit 192 includes an adjustable resistor network in the form of three resistors R5, R6 and R7 connected in series. Switch Q11 is connected in parallel with R6 and R7. Switch Q12 is connected in parallel with resistor R7. When considered together, resistors R5, R6 and R7 and switches Q11 and Q12 create a current discharge path for dissipating the power at the output of the power converter.

Preload control circuit 202 receives an output information signal 194 that is connected to the output voltage and indicates an actual level of the output voltage Vout. Preload control circuit 202 generates switch control signals for turning switches Q11 and Q12 on or off, depending on the level of the output information signal 194. The state of switches Q11 and Q12 changes the equivalent resistance of the resistors R5, R6 and R7 seen by the output of the power converter.

In one embodiment, the switches are switched according to Table 1.

TABLE 1

| Vout | Q11 | Q12 | Equivalent Resistance |
|---|---|---|---|
| Low (e.g. 5 V) | ON | ON | R5 |
| Medium (e.g. 9 V) | ON | OFF | R5 + R6 |
| High (e.g. 12 V) | OFF | OFF | R5 + R6 + R7 |

Thus, when the output voltage Vout is at a low voltage, the equivalent resistance of the dynamic preload circuit 192 is low. When the output voltage Vout is at a medium voltage, the equivalent resistance of the dynamic preload circuit 192 is medium. When the output voltage Vout is at a high voltage, the equivalent resistance of the dynamic preload circuit 192 is high. In one embodiment, the resistors are selected to maintain the ratio of $V^2/R$ at a nearly constant level such that as the output voltage Vout changes, the power consumed by the preload circuit 192 remains almost the same.

As shown in FIG. 2, preload control circuit 202 includes two comparators 206 and 208. Comparator 206 compares the voltage information signal 194 to a reference voltage Vref1 (e.g. 8V). When output information signal 194 is higher than Vref1, comparator 206 drives its output low to turn off Q12. Comparator 208 compares the output information signal 194 to another reference voltage Vref2 (e.g. 11V). When output information signal 194 is higher than Vref2, comparator 208 drives its output low to turn off Q11.

In another embodiment, the output information signal 194 can be a digital signal received from the load, such as a USB signal specifying the desired/target voltage level for the output voltage Vout. The preload control circuit 202 processes the desired/target voltage level then controls the state of switches Q11 and Q12 in accordance with Table 1.

In other embodiments the dynamic preload circuit 192 may include fewer or greater number of resistors and switches so that the resistance of the dynamic preload circuit 192 can be adjusted for other output voltage levels. In a further embodiment, the resistors may be connected in parallel to each other as opposed to being connected serially, and controlled by switches that are serially connected to the resistors.

Figure 3:
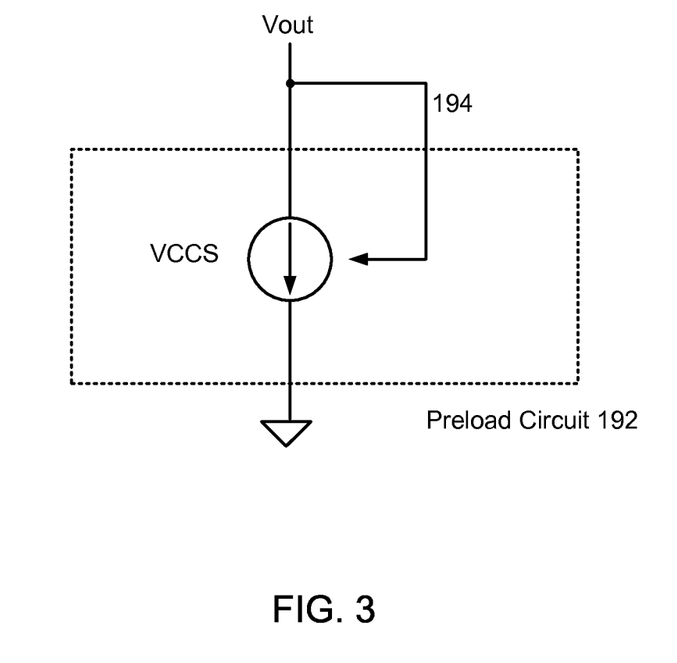
FIG. 3 is a detailed view of the dynamic preload circuit from FIG. 1, according to another embodiment.

FIG. 3 is a detailed view of the dynamic preload circuit 192 from FIG. 1, according to another embodiment. Dynamic preload circuit 192 includes a voltage controlled current source (VCCS). The VCCS receives an output information signal 194 that is connected to the output voltage Vout and provides feedback about the actual voltage level of the output voltage Vout. The VCCS then adjusts the amount of current drawn by the VCCS as the output information signal 194 changes. The VCCS has an inverse relationship between current and voltage. Increasing output voltage Vout levels cause the current to decrease, whereas decreasing output voltage Vout levels cause the current to increase. Due to the relationship of P=IV, this ensures that as the voltage increases, the power dissipated by the dynamic preloading circuit 192 remains substantially the same.

Figure 4:
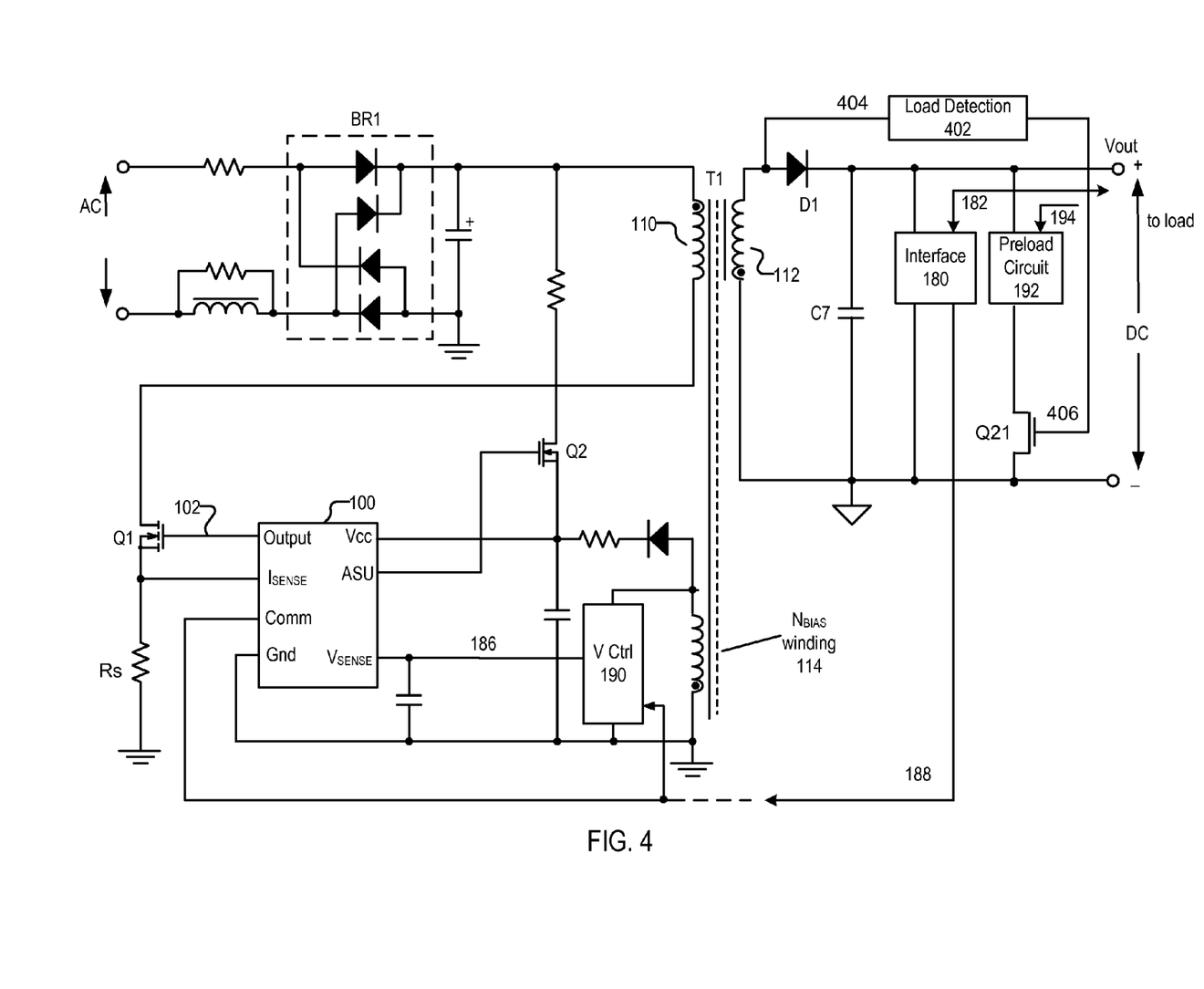
FIG. 4 is an AC-DC flyback power converter with primary-side sensing, according to another embodiment of the present disclosure.

FIG. 4 is an AC-DC flyback power converter with primary-side sensing, according to another embodiment of the present disclosure. The power converter of FIG. 4 is similar to the power converter of FIG. 1, but now includes a load detection circuit 402 and a transistor switch Q21 connected in series with the dynamic preloading circuit 192. Load detection circuit 402 determines whether a load is drawing sufficient power from the output of the power converter. If a load is not drawing power or drawing only a little power, load detection circuit 402 closes switch Q21 so that dynamic preloading circuit can consume the power of the sense pulses. However, if the load is drawing power, the load detection circuit opens switch Q21 so that dynamic preloading circuit does not consume any power. This is because dynamic preloading circuit 192 is only needed when a load is not sufficient to consume the power associated with the sense pulses.

In specific, when a load is drawing power from the output of the power converter, the power converter controller 100 switches Q1 on and off at a high frequency. When a load is not drawing much power from the output of the power converter, the power converter controller 100 uses PFM to switch Q1 on and off at a low frequency with sense pulses. The voltage at the secondary winding 112 also has pulses that increase and decrease at the same switching frequency as switch Q1. Load detection circuit 402 receives a secondary feedback signal 404 that is connected to the secondary winding 112 and is indicative of the frequency of voltage pulses across the secondary winding 112 (and thus, whether power is being drawn by the output load). Load detection circuit 402 determines, from the secondary feedback signal 404, whether a load is coupled to the power converter. A high switching frequency exceeding a threshold indicates that there is a load coupled to the power converter. A low switching frequency below the threshold indicates that there is no load coupled to the power converter. At low switching frequencies below the threshold, the load detection circuit 402 generates switching signal 406 to turn on switch Q21. At high switching frequencies above the threshold, the load detection circuit 402 generates switching signal 406 to turn off switch Q21 to save power.

Upon reading this disclosure, those of ordinary skill in the art will appreciate still additional alternative structural and functional designs for a power converter with dynamic preloading through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:
1. A power converter comprising:
a magnetic component coupled between an input and an output of the power converter, the output of the power converter having an output voltage for providing power to a load;
a switch to control current through the magnetic component according to on and off times of the switch; and
a dynamic preload circuit coupled to the output of the power converter, the dynamic preload circuit dissipating power from the output of the power converter and presenting a resistance to the output of the power converter that is adjusted responsive to a signal indicative of the output voltage at the output of the power converter.

2. The power converter of claim 1, wherein the resistance is adjusted to increase as the output voltage increases.

3. The power converter of claim 1, wherein the resistance of the dynamic preload circuit is adjusted between a plurality of pre-determined resistance levels based on the signal indicative of an output voltage at the output of the power converter.

4. The power converter of claim 1, wherein the dynamic preload circuit comprises:
a plurality of resistors presenting an equivalent resistance to the output of the power converter; and
one or more switches, wherein the switches are switched on or off based on the signal indicative of the output voltage to adjust the equivalent resistance.

5. The power converter of claim 1, wherein the signal indicative of the output voltage at the output of the power converter is a feedback signal indicative of an actual level of the output voltage at the output of the power converter, the resistance of the dynamic preload circuit adjusted based on the feedback signal indicative of the actual level of the output voltage at the output of the power converter.

6. The power converter of claim 1, wherein the signal indicative of the output voltage at the output of the power converter is a signal indicative of a target level of the output voltage at the output of the power converter, the resistance of the dynamic preload circuit adjusted based on the signal indicative of the target level of the output voltage at the output of the power converter.

7. The power converter of claim 1, further comprising:
a switch coupled in series with the dynamic preload; and
a load detection circuit adapted to receive a feedback signal indicative of whether the load is drawing power from the power converter and to generate a switch control signal for controlling a state of the switch based on the feedback signal.

8. The power converter of claim 7, wherein the load detection circuit generates the switch control signal to turn the switch on responsive to the feedback signal indicating that the load is drawing substantially no power from the power converter.

9. The power converter of claim 7, wherein the load detection circuit generates the switch control signal to turn the switch on responsive to a switching frequency of the feedback signal being below a threshold frequency.

10. The power converter of claim 1, wherein the power converter is a flyback power converter and the magnetic component is a transformer having a primary side and a secondary side.

11. A power converter comprising:
a magnetic component coupled between an input and an output of the power converter, the output of the power converter having an output voltage for providing power to a load;

a switch to control current through the magnetic component according to on and off times of the switch; and
a dynamic preload circuit coupled to the output of the power converter, the dynamic preload circuit adapted to draw current from the output of the power converter and adapted to adjust the current drawn from the output of the power converter based on a signal indicative of the output voltage at the output of the power converter.

12. The power converter of claim 11, wherein the current drawn from the output of the power converter by the dynamic preload circuit is adjusted to decrease as the output voltage increases.

13. The power converter of claim 11, wherein the current drawn from the output of the power converter by the dynamic preload circuit is adjusted between a plurality of pre-determined current levels based on the signal indicative of an output voltage at the output of the power converter.

14. The power converter of claim 11, wherein the dynamic preload circuit comprises a voltage controlled current source.

15. The power converter of claim 11, wherein the signal indicative of the output voltage at the output of the power converter is a feedback signal indicative of an actual level of the output voltage at the output of the power converter, the current drawn from the output of the power converter by the dynamic preload circuit adjusted based on the feedback signal indicative of the actual level of the output voltage at the output of the power converter.

16. The power converter of claim 11, wherein the signal indicative of the output voltage at the output of the power converter is a signal indicative of a target level of the output voltage at the output of the power converter, the current drawn from the output of the power converter by the dynamic preload circuit adjusted based on the signal indicative of the target level of the output voltage at the output of the power converter.

17. The power converter of claim 11, further comprising:
a switch coupled in series with the dynamic preload; and
a load detection circuit adapted to receive a feedback signal indicative of whether the load is drawing power from the power converter and to generate a switch control signal for controlling a state of the switch based on the feedback signal.

18. The power converter of claim 17, wherein the load detection circuit generates the switch control signal to turn the switch on responsive to the feedback signal indicating that the load is drawing substantially no power from the power converter.

19. The power converter of claim 11, wherein the power converter is a flyback power converter and the magnetic component is a transformer having a primary side and a secondary side.

20. A method of operation in a power converter having a magnetic component coupled between an input and an output of the power converter, the method comprising:
regulating an output voltage at the output of the power converter for providing power to a load by switching current through the magnetic component, the output of the power converter coupled to a dynamic preload circuit that dissipates power from the output of the power converter; and
adjusting one of:
a resistance presented by the dynamic preload circuit to the output of the power converter based on a signal indicative of the output voltage at the output of the power converter, or
a current drawn from the output of the power converter by the dynamic preload circuit based on a signal indicative of the output voltage at the output of the power converter.

* * * * *